United States Patent [19]

(12) United States Patent
Lambert

(10) Patent No.: US 8,923,091 B2
(45) Date of Patent: Dec. 30, 2014

(54) DUAL-SENSOR NOISE-REDUCTION SYSTEM FOR AN UNDERWATER CABLE

(75) Inventor: Dale J. Lambert, Mandeville, LA (US)

(73) Assignee: ION Geophysical Corporation, Houston, TX (US)

( * ) Notice: Subject to any disclaimer, the term of this patent is extended or adjusted under 35 U.S.C. 154(b) by 417 days.

(21) Appl. No.: 13/009,287

(22) Filed: Jan. 19, 2011

(65) Prior Publication Data

US 2011/0176385 A1    Jul. 21, 2011

Related U.S. Application Data

(60) Provisional application No. 61/296,055, filed on Jan. 19, 2010.

(51) Int. Cl.
| | | |
|---|---|---|
| *G01V 1/38* | (2006.01) | |
| *G01V 1/36* | (2006.01) | |
| *G01S 7/28* | (2006.01) | |
| *G01S 7/292* | (2006.01) | |

(52) U.S. Cl.
CPC  *G01V 1/364* (2013.01); *G01V 1/38* (2013.01); *G01S 7/28* (2013.01); *G01S 7/292* (2013.01); *G01V 2210/56* (2013.01); *G01V 2210/32* (2013.01)
USPC .............................................. 367/24; 381/92

(58) Field of Classification Search
CPC .................................. G01V 1/38; G01V 1/364
USPC .......................................................... 367/24
See application file for complete search history.

(56) References Cited

U.S. PATENT DOCUMENTS

| | | | |
|---|---|---|---|
| 4,437,175 A | 3/1984 | Berni | |
| 4,486,865 A | 12/1984 | Ruehle | |
| 4,520,467 A | 5/1985 | Berni | |
| 4,811,404 A * | 3/1989 | Vilmur et al. ................ | 381/94.3 |
| 5,251,183 A | 10/1993 | McConnell et al. | |
| 5,448,531 A | 9/1995 | Dragoset, Jr. | |
| 5,528,555 A | 6/1996 | Santos et al. | |
| 5,621,699 A | 4/1997 | Rigsby et al. | |
| 5,774,416 A | 6/1998 | Sadek et al. | |
| 5,825,898 A * | 10/1998 | Marash ........................... | 381/92 |
| 6,512,980 B1 * | 1/2003 | Barr ................................. | 702/1 |

(Continued)

OTHER PUBLICATIONS

International Search Report and Written Opinion of the International Searching Authority in International Patent Application No. PCT/US11/21678, European Patent Office, mailed Apr. 10, 2012.

*Primary Examiner* — Ian J Lobo
*Assistant Examiner* — Hovhannes Baghdasaryan
(74) *Attorney, Agent, or Firm* — James T. Cronvich

(57) ABSTRACT

A system and a method for rejecting noise in an underwater sensor cable, such as a towed streamer or an ocean-bottom cable. An adaptive hydrodynamic model of the cable produces an estimated sensor signal from a raw sensor signal from a particle-motion sensor, such as an accelerometer. The estimated sensor signal represents an estimate of the response of the underwater cable to cable motion absent seismic events. A noise-reduced response to particle motion alone is produced by subtracting the estimated sensor signal from the raw sensor signal to reject cable motion and other noise effects in the raw sensor signal. A seismic event detector uses a hydrophone signal from an acceleration-canceling hydrophone to disable the adapting of the hydrodynamic model during seismic events. The hydrophone signal is combined with the response to particle motion by PZ summation to produce a deghosted seismic response signal.

22 Claims, 1 Drawing Sheet

(56) References Cited

U.S. PATENT DOCUMENTS

| | | |
|---|---|---|
| 6,539,308 B2 | 3/2003 | Monk et al. |
| 6,894,948 B2 * | 5/2005 | Brittan et al. ............ 367/24 |
| 7,167,413 B1 | 1/2007 | Rouquette |
| 7,239,577 B2 | 7/2007 | Tenghamn et al. |
| 7,336,561 B2 | 2/2008 | Borresen |
| 7,379,385 B2 | 5/2008 | Ferber |
| 7,379,386 B2 * | 5/2008 | Muyzert et al. ............ 367/63 |
| 7,505,361 B2 | 3/2009 | Sollner |
| 2006/0245300 A1 | 11/2006 | De Kok et al. |
| 2007/0265786 A1 | 11/2007 | Ozdemir et al. |
| 2008/0008037 A1 | 1/2008 | Welker |
| 2009/0040872 A1 | 2/2009 | Pabon et al. |
| 2009/0067285 A1 | 3/2009 | Robertsson et al. |
| 2009/0161487 A1 | 6/2009 | Kjellgren et al. |
| 2009/0251992 A1 | 10/2009 | vanBorselen et al. |
| 2009/0316527 A1 | 12/2009 | Stewart et al. |
| 2010/0008184 A1 | 1/2010 | Hegna et al. |
| 2010/0091610 A1 | 4/2010 | Sollner |
| 2010/0202251 A1 | 8/2010 | Ozdemir et al. |
| 2011/0082647 A1 * | 4/2011 | Edme et al. ............ 702/17 |

* cited by examiner

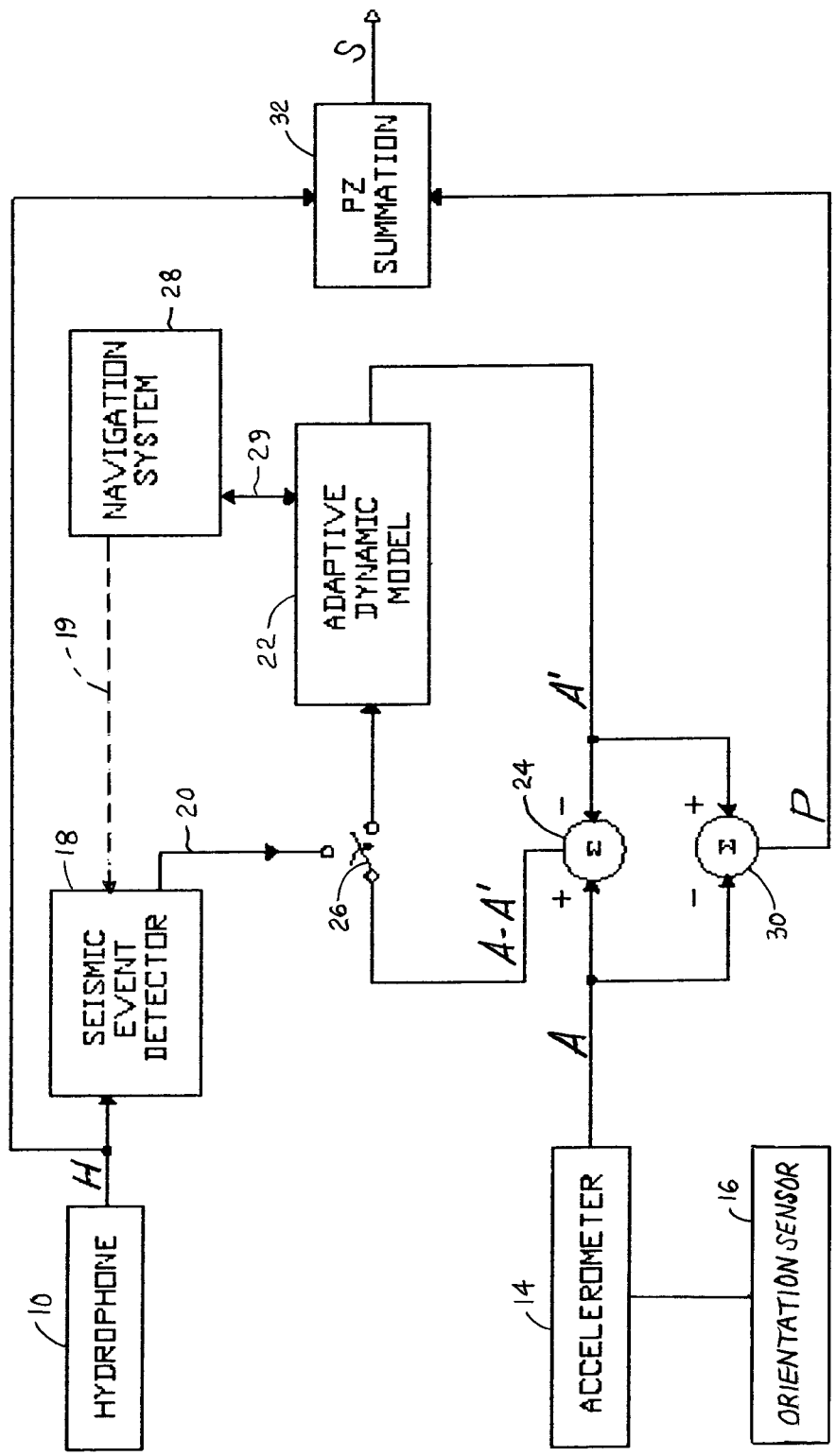

DUAL-SENSOR NOISE-REDUCTION SYSTEM FOR AN UNDERWATER CABLE

CROSS-REFERENCE TO RELATED APPLICATIONS

This application claims priority to U.S. Provisional Patent Application Ser. No. 61/296,055, "Dual-Sensor Noise-Reduction System for an Underwater Cable," filed Jan. 19, 2010, and incorporated entirely by reference into this specification.

BACKGROUND

The invention relates generally to marine seismic prospecting and more particularly to apparatus and methods for reducing the effects of undesired seismic reflections in sensors towed behind a survey vessel or in sensors laid on the sea bottom.

In towed marine seismic exploration, a hydrophone array is towed behind a marine vessel near the sea surface. The hydrophones reside in multiple sensor cables commonly referred to as streamers. A seismic source, also towed near the sea surface, periodically emits acoustic energy. This acoustic energy travels downward through the sea, reflects off underlying structures, and returns upward through the sea to the hydrophone array. The hydrophone array records the upward traveling seismic acoustic wave from the seabed. The hydrophone recordings are later processed into seismic images of the underlying structures.

Acoustic impedance is the product of the density $\rho$ and the speed of sound c in a medium, $\rho c$. Reflections occur any time a change in acoustic impedance is encountered by the sound waves. The greater the change in acoustic impedance, the more the energy is reflected. Since the acoustic impedance of air and water differ greatly, the sea surface is a nearly perfect reflector of sound energy. After returning from the sea bottom or the target of interest, the energy is again reflected by the sea surface back toward the streamer. Because a hydrophone has an omni-directional response, the hydrophone array records a ghost response, which is the seismic acoustic wave reflected from the sea surface and arriving delayed in time and reversed in polarity from the direct reflection. The ghost is a downward traveling seismic acoustic wave that, when added to the desired wave, detracts from the recorded seismic image.

The ghost produces a notch in the frequency spectrum of a hydrophone response at $f_{notch}=c/2d$, where c is the speed of sound and d is the streamer depth. Seismic streamers have been conventionally towed at a depth of 10 meters or less. At a depth of 10 m, the notch frequency $f_{notch}$ is 75 Hz. A frequency response extending beyond 100 Hz is required for high seismic image resolution. Streamers are therefore sometimes towed at shallower depths to improve the resolution of a seismic image.

The ghost-causing reflection can also continue to the sea bottom or other strong reflector and be reflected back up to again interfere with the desired reflections and degrade the image. These reflections are commonly referred to as multiples.

Towing at shallow depths is problematic because noise from the sea surface interferes with the desired seismic signals. Furthermore, circular water currents near the sea surface can cause flow noise at the streamer skin. These effects are worsened as weather deteriorates, sometimes causing the crew to discontinue operations until the weather improves. The deeper the tow, the less sea-surface noise and weather are factors. If the ghost-notch effects can be eliminated, it is desirable to tow at greater depths.

Ocean-bottom, or seabed, systems, in which the seismic cable or sensors are placed on the seabed, reject ghosts by a technique commonly known as p-z summation. In an acoustic wave, the pressure p is a scalar and the particle velocity u is a vector. A hydrophone records the seismic acoustic wave pressure p, with a positive omni-directional response. A vertically oriented geophone or accelerometer records the vertical component of the seismic acoustic wave particle velocity $u_z$, with a positive response to upgoing signals and a negative response to downgoing signals. In p-z summation, the velocity signal is scaled by the acoustic impedance $\rho c$ of seawater and added to the pressure signal. If an accelerometer is used, its output can be integrated to obtain the velocity signal, or the hydrophone signal can be differentiated so that it can better spectrally match the accelerometer signal. This produces a compound sensor that has full response to the upward traveling wave and zero response to the downward traveling wave to reject the ghost and multiples. One such method of signal conditioning and combination of signals to get a single deghosted trace is described in U.S. Pat. No. 6,539,308 by Monk et al. This and similar techniques work well when the particle-velocity sensor or accelerometer is not affected by unwanted motions due to factors not caused by the desired signal. Such unwanted accelerations are common in a seabed system deployed in a surf zone or area when there are strong bottom currents.

Recently there has been interest in using the combination of hydrophones and particle-motion measurement to reduce these effects in a seismic streamer. Operating a particle-motion sensor in a seismic streamer presents a problem because the streamer experiences accelerations due to towing or sea-surface effects that are large compared to accelerations caused by the desired reflections. Moreover, these unwanted accelerations are in the same spectral band as the desired reflection response.

Seismic streamers and seabed seismic cables experience all roll angles from 0° to 360° and moderate pitch angles. To implement a vertically oriented geophone, ocean-bottom systems have used: (a) a gimbaled moving-coil geophone; (b) a 3-component, omni-tilt moving-coil geophone with attitude sensing and computation external to the sensor to resolve the measurement relative to gravity; and (c) a 3-component, micro-electro-mechanical system (MEMS) accelerometer with internal attitude sensing and computation external to the sensor to resolve the measurement relative to gravity.

U.S. Pat. No. 7,167,413 to Rouquette uses an accelerometer in a seismic streamer to reject the ghost-notch effect. Rouquette uses a mass-spring system to reduce the effect of cable dynamics on the accelerometer and a load-cell system to measure and reject the cable-motion-induced noise on the accelerometer. The Rouquette system relies on well-known complex mechanical relationships that do not remain constant with manufacturing tolerances, aging, and environmental conditions. Rouquette uses a signal-processing adaptive algorithm to derive the relationship of the load-cell-sensor-and-mass-spring system to the acceleration acting on the accelerometer in situ. Rouquette describes a complex mechanical and electronic system.

U.S. Pat. No. 7,239,577 to Tenghamn et al. describes an apparatus and method for rejecting the ghost notch using an acoustic-wave particle-velocity sensor. Tenghamn et al. teaches the use of a fluid-damped, gimbaled geophone. It is known in the art that the fluid encapsulating the geophone is chosen to provide damping of the sensor swinging on its gimbals. While not described in Tenghamn et al., it is known in the art that a mass-spring vibration-isolation system can reduce the effect of cable mechanical motion on the geophone response. Motion of the geophone caused by cable mechanical motion is indistinguishable from acoustic-wave particle motion in the geophone response. The desired seismic-wave particle motion is obscured by cable mechanical motion in Tenghamn et al.

U.S. Pat. No. 7,359,283 to Vaage et al. describes a method of combining pressure sensors and particle-motion sensors to address the impact of mechanical motion on the particle-motion sensors. In this method, the response of the particle-motion sensor below a certain frequency $f_o$ is not used, but only estimated from the pressure-sensor response and the known pressure-sensor depth. The frequencies rejected are those for which mechanical motion of the streamer is expected. The estimated response has a poor signal-to-noise ratio at the lower frequencies of interest. This rejection below a certain frequency is not optimal as it also rejects valid signals in an important low-frequency band where deep-target data is likely to exist.

While the patents mentioned all describe methods to reject the ghost notch in a seismic streamer, all fall short of adequately accounting for the effects of streamer tow and current-induced motion on particle-motion sensors. All also fall short of producing high-fidelity, sensed acoustic-wave components with good signal-to-noise ratio down to the lowest frequencies of interest.

SUMMARY

These shortcomings are overcome by a noise-rejection system for an underwater cable embodying features of the invention. One version of such a system comprises a particle-motion sensor disposed in an underwater cable. The sensor produces a raw sensor signal that includes responses to particle motion due to seismic events and cable motion. An adaptive processing means uses an adaptive hydrodynamic model of the underwater cable to produce an estimated sensor signal from the raw sensor signal. The estimated sensor signal represents an estimate of the response of the underwater cable to cable motion in the absence of seismic events. Means for subtracting the estimated sensor signal from the raw sensor signal is used to determine the response to particle motion due to seismic events.

Another version of an underwater-cable noise-reduction system comprises a particle-motion sensor disposed in an underwater cable. The sensor produces a raw sensor signal. Adaptive processing means uses an adaptive hydrodynamic model of the underwater cable to produce an estimated sensor signal from the raw sensor signal. A seismic event detector sensitive to seismic events disables the adaptive processing means during a seismic event. In this way, the estimated sensor signal represents the response of the particle-motion sensor to noise sources in the absence of seismic events.

In another aspect of the invention, a method for reducing noise in an underwater cable comprises: (a) using an adaptive hydrodynamic model of an underwater cable to compute an estimated sensor signal due to cable motion from a raw sensor signal provided by a particle-motion sensor disposed on the underwater cable; and (b) determining the response to particle motion due to seismic events by subtracting the estimated sensor signal from the raw sensor signal.

BRIEF DESCRIPTION OF THE DRAWINGS

These aspects and features of the invention are better understood by referring to the following description, appended claims, and accompanying drawings, in which:

FIG. 1 is a block diagram of an underwater-cable noise-reduction system embodying features of the invention.

DETAILED DESCRIPTION

In the block diagram of FIG. 1, a hydrophone 10 produces a hydrophone signal H. The hydrophone may be realized as a single hydrophone or a group of hydrophones mounted in an underwater sensor cable such as a streamer towed by or an ocean-bottom cable connected to a survey vessel. The hydrophone in this example is an acceleration-canceling hydrophone that is sensitive to pressure variation, but insensitive to accelerations due to sensor cable dynamics. Roughly co-located with the hydrophone in the sensor cable is a second sensor, a particle-motion sensor 14—in this example, a three-axis accelerometer—that measures particle acceleration due to seismic reflections. The particle-motion sensor could be any sensor responsive to particle velocity or acceleration. Accelerometers, geophones, acceleration-sensitive hydrophones, groups of similar such sensors, or combinations of different such sensors are other examples of particle-motion-sensor realizations. The particle-motion sensor 14 produces a raw sensor signal A that includes responses to particle motion due to seismic events and to cable motion.

Because of the possibility of dynamic rotation of the sensor cable, an orientation sensor 16 associated with the particle-motion sensor 14 is used to orient the particle-motion measurement relative to the gravity vector. A multi-axis sensor such as a MEMS accelerometer with a response down to dc combines the particle-motion sensing and the orientation sensing in a single component. Conventional computation means can be used to orient the particle-motion measurement relative to gravity. The particle-motion sensor could be a two-axis unit if one axis of orientation is known and cable motion along that axis is not a factor. A two-axis sensor is usable in a towed streamer for which the axis parallel to the streamer is determined by other means, such as a navigation system. Another alternative is to use a gimbaled particle-motion sensor, such as a gimbaled geophone, capable of righting itself. In a gimbaled particle-motion sensor, an orientation sensor is not necessary. Another alternative is a separate orientation sensor used in combination with the particle-motion sensor. In any event, the raw sensor signal A used in the block diagram and throughout this specification refers to a gravity-referenced measurement.

A seismic event detector 18 analyzes the hydrophone signal H to determine the presence or absence of a seismic event, such as reflected seismic signals. Whenever the amplitude of the hydrophone signal exceeds a predetermined threshold within a predetermined frequency spectrum, the seismic event detector outputs a seismic event signal 20. The actual detection of a seismic event can be done by electronics in the cable or by analysis of the hydrophone signal aboard the survey vessel. The detection may be performed in real time during data acquisition or in post-acquisition processing. A seismic navigation system 28, such as Spectra or Orca by ION Geophysical Corporation of Houston, Tex., U.S.A., is also typically used during marine acquisition. The seismic navigation system provides a seismic-source firing event signal. The seismic navigation system 28 may pass the seismic-source firing event signal to the seismic event detector 18 to improve detection reliability.

An adaptive dynamic model 22 is used as adaptive processing means to estimate the response of the particle-motion sensor 10 to cable motion. A Kalman filter can be applied as part of the adaptive processing means to improve the model. When no seismic event is being detected, the raw sensor signal A is compared with an estimated sensor signal A' in a subtraction block 24 that constitutes a means for subtracting the estimated from the raw sensor signal. The difference A-A' is used to update the covariance matrix of the Kalman filter in the adaptive processing means. Other options for adaptation include recursive least squares, a neural network, or fuzzy logic. If it is determined that the desired seismic response corrupts the model, given that the desired seismic response being detected occurs at the hydrophone and accelerometer simultaneously, model adaptation can be disabled during a seismic event by the seismic event signal 20, as represented by a switch 26. Model application and adaptation can be performed by computational means deployed in the streamer, on the ship, or on land. It can be done in real time during data acquisition, or in post-processing. Optionally, the accuracy of the dynamic model can be improved by using other information available to the model. This may include measurement of real-time ship dynamics, GPS data, vessel speed, or any other measurement pertinent to sensor cable dynamics. The shipboard navigation system 28 estimates streamer positions, velocities, and accelerations at locations where the seismic energy is detected. This computed navigation data 29 can be used to improve the accuracy of the dynamic model. The dynamic model can also be used by the navigation system to augment the data supporting its estimations, as indicated by the bi-directionality of the flow of navigation data 29.

Because the seismic event detector 18 disables adaptation by the adaptive dynamic model during seismic events, the output of the dynamic model (the estimated sensor signal A') will represent the response of the accelerometer to cable motion and other noise sources in the absence of desired seismic reflections. The difference between the estimated sensor signal A' and the raw sensor signal A is produced in a second means for subtracting 30. The difference represents a reduced-noise response P to particle motion, which is the desired seismic response. A PZ summation 32 is used to reject the ghost notch or response due to unwanted multiples by forming a means for combining the response to particle motion P with the hydrophone signal H, which may be differentiated to spectrally match the raw particle-motion-sensor signal A, to produce a deghosted seismic response signal S.

Although the invention has been described in detail with reference to a single version with variations, other versions are possible. For example, the method of combining hydrophone and particle-motion measurements can be done by PZ summation, as described, or by any of the other means being used or studied to reduce the effects of multiples or ghost notch. Furthermore, the conditioning and scaling of individual hydrophone and particle-motion measurements and all the other computations described may be performed in real time or off-line in post-processing. This may include scaling of the particle-motion measurement due to angle of incidence or acoustic impedance. It may also include differentiation or integration of signals so that they are spectrally matched. So, as these few examples suggest, the versions described in detail are meant to help exemplify and not limit the invention.

What is claimed is:

1. A noise-rejection system for an underwater cable, comprising:
a particle-motion sensor disposed in an underwater cable and producing a raw sensor signal that includes responses to particle motion due to seismic events and cable motion;
adaptive processing means using an adaptive dynamic model of the underwater cable to produce an estimated sensor signal from the raw sensor signal from the particle-motion sensor, wherein the estimated sensor signal represents an estimate of the response of the underwater cable to cable motion in the absence of seismic events;
an acceleration-canceling hydrophone producing a hydrophone signal;
a seismic event detector receiving the hydrophone signal, detecting seismic events from the hydrophone signal, and producing a seismic event signal indicating the presence of seismic events, the seismic event signal disabling the adaptive processing means from updating the adaptive dynamic model only during the seismic events;
means for subtracting the estimated sensor signal from the raw sensor signal to determine the response to particle motion due to seismic events;
means for combining the response to particle motion due to seismic events and the hydrophone signal to produce a seismic response signal.

2. A noise-rejection system as in claim 1 wherein the acceleration-canceling hydrophone and the particle-motion sensor are co-located on the underwater cable.

3. A noise-rejection system as in claim 1 further comprising means for combining the response to particle motion and the hydrophone signal to produce a seismic response signal.

4. A noise-rejection system as in claim 1 wherein the adaptive processing means uses the adaptive dynamic model to update the estimated sensor signal to an updated estimated sensor signal from the difference between the raw sensor signal and the previously updated estimated sensor signal.

5. A noise-rejection system as in claim 1 further comprising a shipboard navigation system providing navigation data to the adaptive dynamic model.

6. A noise-rejection system as in claim 1 further comprising a shipboard navigation system receiving data from the adaptive dynamic model to improve the quality of navigation data computed by the shipboard navigation system.

7. A noise-rejection system as in claim 1 further comprising a shipboard navigation system providing a seismic-source firing event signal to the seismic event detector.

8. A noise-rejection system as in claim 1 wherein the adaptive processing means operates in real time.

9. A noise-rejection system as in claim 1 wherein the adaptive processing means operates off-line on the stored raw sensor signal.

10. A method for rejecting noise in an underwater cable, comprising:
providing a raw sensor signal that includes responses to particle motion due to seismic events and cable motion with a particle-motion sensor disposed in the underwater cable;
computing an estimated sensor signal due to cable motion from the raw sensor signal produced by the particle-motion sensor by using an adaptive dynamic model of the dynamics of an underwater cable;
detecting seismic events with an acceleration-canceling hydrophone co-located with the particle-motion sensor in the underwater cable and producing a seismic event signal indicating seismic events detected by the acceleration-canceling hydrophone;
updating the adaptive dynamic model only between seismic events;
disabling the updating of the adaptive dynamic model only when the seismic event signal indicates the presence of seismic events;
subtracting the estimated sensor signal from the raw sensor signal to determine the response to particle motion due to seismic events.

11. The method of claim 10 further comprising combining the response to particle motion due to seismic events and a hydrophone signal from the hydrophone co-located with the particle-motion sensor to produce a seismic response signal.

12. The method of claim 10 further comprising providing navigation data from a shipboard navigation system to the adaptive dynamic model.

13. The method of claim 10 further comprising using the estimated sensor signal to improve the quality of navigation data computed by a shipboard navigation system.

14. The method of claim 10 operated in real time.

15. The method of claim 10 further comprising using the adaptive dynamic model off-line to compute the estimated sensor signal.

16. A noise-rejection system for an underwater cable, comprising:
    a particle-motion sensor disposed in an underwater cable and producing a raw sensor signal;
    an acceleration-canceling hydrophone co-located with the particle-motion sensor and producing a hydrophone signal;
    a seismic event detector detecting seismic events from the hydrophone signal and producing a seismic event signal indicating the presence of seismic events;
    adaptive processing means using an adaptive dynamic model of the dynamics of the underwater cable, wherein the adaptive dynamic model is updated between seismic events detected by the seismic event detector and disabled from updating by the seismic event signal only during seismic events to produce an estimated sensor signal from the raw sensor signal produced by the particle-motion sensor, the estimated sensor signal representing the response of the particle-motion sensor to noise sources in the absence of seismic events; and
    means for subtracting the estimated sensor signal from the raw sensor signal to determine the response to particle motion due to seismic events.

17. A noise-rejection system as in claim 16 further comprising means for combining the response to particle motion due to seismic events and the hydrophone signal to produce a seismic response signal.

18. A noise-rejection system as in claim 16 wherein the adaptive processing means updates the dynamic model based on the difference between the raw sensor signal and the estimated sensor signal to produce an updated estimated error signal.

19. A noise-rejection system as in claim 16 further comprising a shipboard navigation system providing navigational data to the adaptive dynamic model.

20. A noise-rejection system as in claim 16 further comprising a shipboard navigation system receiving data from the adaptive dynamic model to improve the quality of navigational data computed by the shipboard navigation system.

21. A noise-rejection system as in claim 16 wherein the adaptive processing means operates in real time.

22. A noise-rejection system as in claim 16 wherein the adaptive processing means operates off-line on the stored raw sensor signal.

* * * * *